(12) United States Patent
Condorelli et al.

(10) Patent No.: US 8,140,792 B2
(45) Date of Patent: Mar. 20, 2012

(54) INDIRECTLY-ACCESSED, HARDWARE-AFFINE CHANNEL STORAGE IN TRANSACTION-ORIENTED DMA-INTENSIVE ENVIRONMENTS

(75) Inventors: Vincenzo Condorelli, Poughkeepsie, NY (US); Silvio Dragone, Adliswil (CH); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 12/392,282

(22) Filed: Feb. 25, 2009

(65) Prior Publication Data

US 2010/0217946 A1 Aug. 26, 2010

(51) Int. Cl.
*G06F 13/00* (2006.01)
(52) U.S. Cl. .................. 711/162; 711/154; 711/164
(58) Field of Classification Search .......... 711/154, 711/162, 164
See application file for complete search history.

(56) References Cited

U.S. PATENT DOCUMENTS

| | | | | |
|---|---|---|---|---|
| 5,521,979 | A | * | 5/1996 | Deiss .............................. 380/212 |
| 5,604,743 | A | * | 2/1997 | Le Guigner et al. .......... 370/392 |
| 6,917,685 | B1 | * | 7/2005 | Watanabe et al. ............. 380/262 |
| 2003/0005434 | A1 | * | 1/2003 | Deiss et al. ..................... 725/25 |
| 2003/0041163 | A1 | * | 2/2003 | Rhoades et al. ............... 709/232 |
| 2005/0068952 | A1 | * | 3/2005 | Deiss et al. .................... 370/389 |

* cited by examiner

*Primary Examiner* — Reba I Elmore
(74) *Attorney, Agent, or Firm* — Scully, Scott, Murphy & Presser, P.C.; Gail H. Zarick, Esq.

(57) ABSTRACT

Embodiments of the invention provide a method, system, and computer program product for managing a computer memory system including a channel controller and a memory area. In one embodiment, the method comprises the channel controller receiving a request including a header and a payload, and separating said memory area into a working memory area and an auxiliary memory area. A copy of the header is deposited in the working memory area; and a full copy of the request, including a copy of the header and a copy of the payload, is deposited in the auxiliary memory area. The copy of the request in the auxiliary memory area is used to perform hardware operations; and the copy of the header in the working memory area is used to perform software operations.

20 Claims, 5 Drawing Sheets

REQUEST DATA FLOW

OPERATION DATA FLOW

RESPONSE DATA FLOW

REQUEST DESCRIPTOR SETUP

INDIRECTLY-ACCESSED, HARDWARE-AFFINE CHANNEL STORAGE IN TRANSACTION-ORIENTED DMA-INTENSIVE ENVIRONMENTS

BACKGROUND OF THE INVENTION

1. Field of the Invention

The present invention generally, relates to computing systems, and more specifically, to performing, in a computing system, software operations that are interleaved with hardware-assisted instructions. One embodiment of the invention provides a computing system where externally originated requests are processed by a general-purpose processor with virtual memory (VM) support and local accelerator circuits (such as encryption engines).

2. Background Art

In modern VM environments, with multiple layers of indirection between physical DRAM chips and virtual addresses, the required VM operations are among the most expensive ones, needed both before and after each hardware operation, mainly due to cache management. Hardware, including Direct Memory Access (DMA) devices, addresses the same memory at bus-level addresses. The need to (repeatedly) synchronize VM and DMA references is usually a known performance-limiting factor.

In a VM environment, addresses perceived by software are mapped indirectly to hardware addresses. If software operations are interleaved with hardware-assisted instructions, cached contents must be repeatedly synchronized with SDRAM contents (inhibiting caching), and one must map between hardware and virtual addresses repeatedly. Mapping and synchronization between virtual and hardware addresses stress VM mechanisms, which is a recognized problem. Zero-copy operations, transforming software to facilitate faster migration between virtual and hardware addressing, is one solution, however this may require significant application-visible adjustment.

An unusual property of embedded cryptographic systems (such as hardware security modules, HSMs) is that requests may usually be separated to fixed (bounded) size headers and variable-length payload. Headers need to be visible to software. In many cases, however, payload only passes through a number of hardware-accelerated operations (such as en/decryption or hashing), then returned to the external user. In such a system, if headers are sufficiently descriptive, internal software may indirectly steer the required transfer operations (such as request specific parts of payload to be DMAed to an accelerator chip), while the actual payload need not be mapped through VM.

SUMMARY OF THE INVENTION

Embodiments of the invention provide a method, system, and computer program product for managing a computer memory system including a channel controller and a memory area. In one embodiment, the method comprises the channel controller receiving a request including a header and a payload, and separating said memory area into a working memory area and an auxiliary memory area. A copy of the header is deposited in the working memory area; and a full copy of the request, including a copy of the header and a copy of the payload, is deposited in the auxiliary memory area. The copy of the request in the auxiliary memory area is used to perform hardware operations, and the copy of the header in the working memory area is used to perform software operations.

In an embodiment of the invention, the working memory area is directly accessible by a central processor unit including a software application to perform software operations. In an embodiment of the invention, the working memory area is a virtual memory, the auxiliary memory area is not represented in the virtual memory, and the auxiliary memory area is addressable through hardware level addresses.

An embodiment of the invention provides a system which features a central communications channel, processor or processors (CPU) accessing Working Memory (WMEM), and auxiliary memory reserved for channel use. The auxiliary memory is directly accessible by the channel, and specifically this auxiliary memory is directly-mapped memory (DM-MEM), entirely addressable by DMA hardware. The DMMEM is reserved to be entirely controlled by the channel, and it is not represented in the CPU VM. (Typically, the DMMEM may reside in a reserved address range of channel-visible memory.) The channel controls memory allocation for the entire system.

An embodiment of the invention provides a system which reduces the number of VM/DMA interactions, by transferring only request headers through the VM subsystem, and addressing the rest of requests indirectly, without VM involvement. This embodiment allows cooperating applications to indirectly access the remainder of the request, which is stored in channel-managed memory. The channel includes directly-mapped local memory (invisible to software) to store requests payloads; this memory is bus-addressable, and is not represented within the VM. The software can request the channel to copy the entire payload into the WMEM. The access is secured with a nonce protection mechanism. Embodiments of the invention allow existing applications to continue using the proposed communication channel without modification.

DETAILED DESCRIPTION OF PREFERRED EMBODIMENTS

Figure 1:
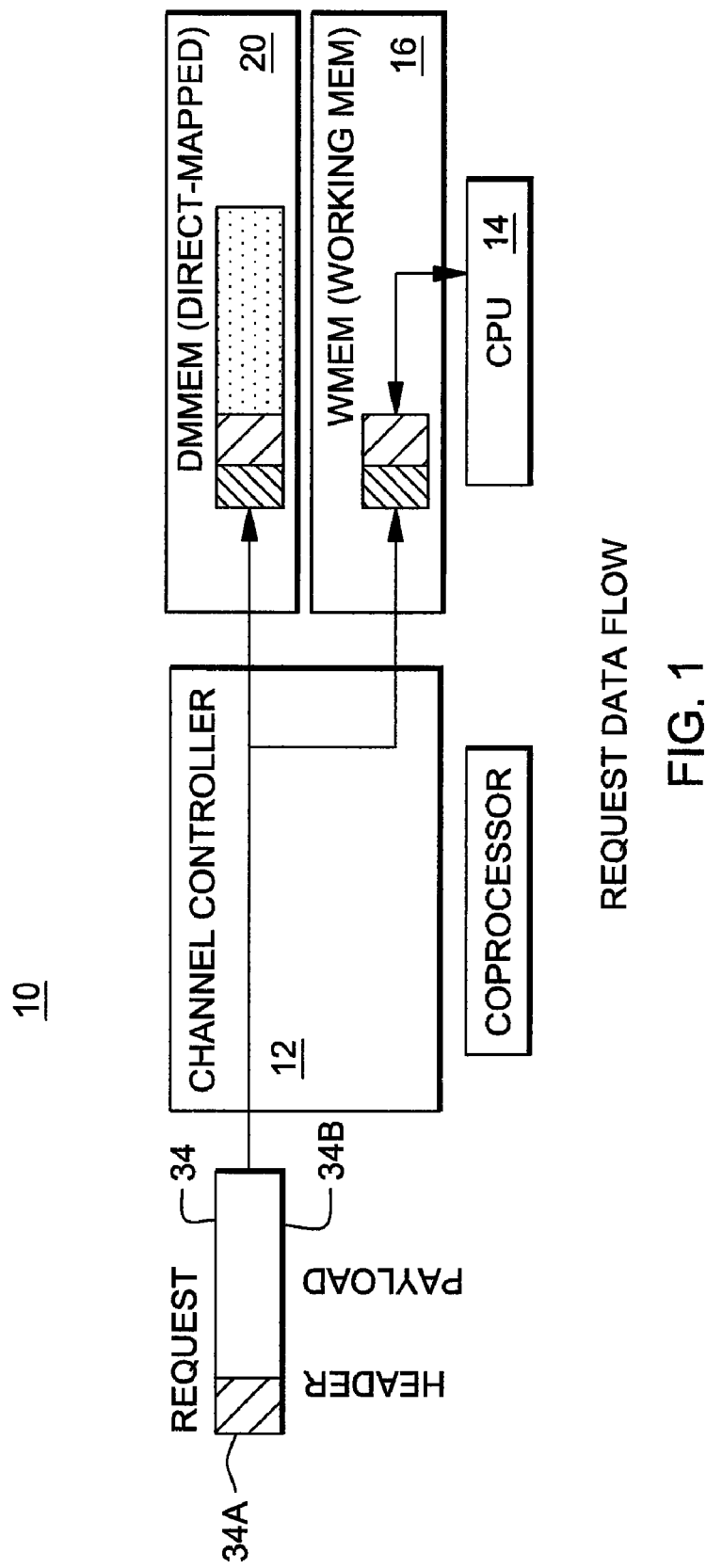
FIG. 1 illustrates request data flow in an embodiment of the invention.
Figure 2:
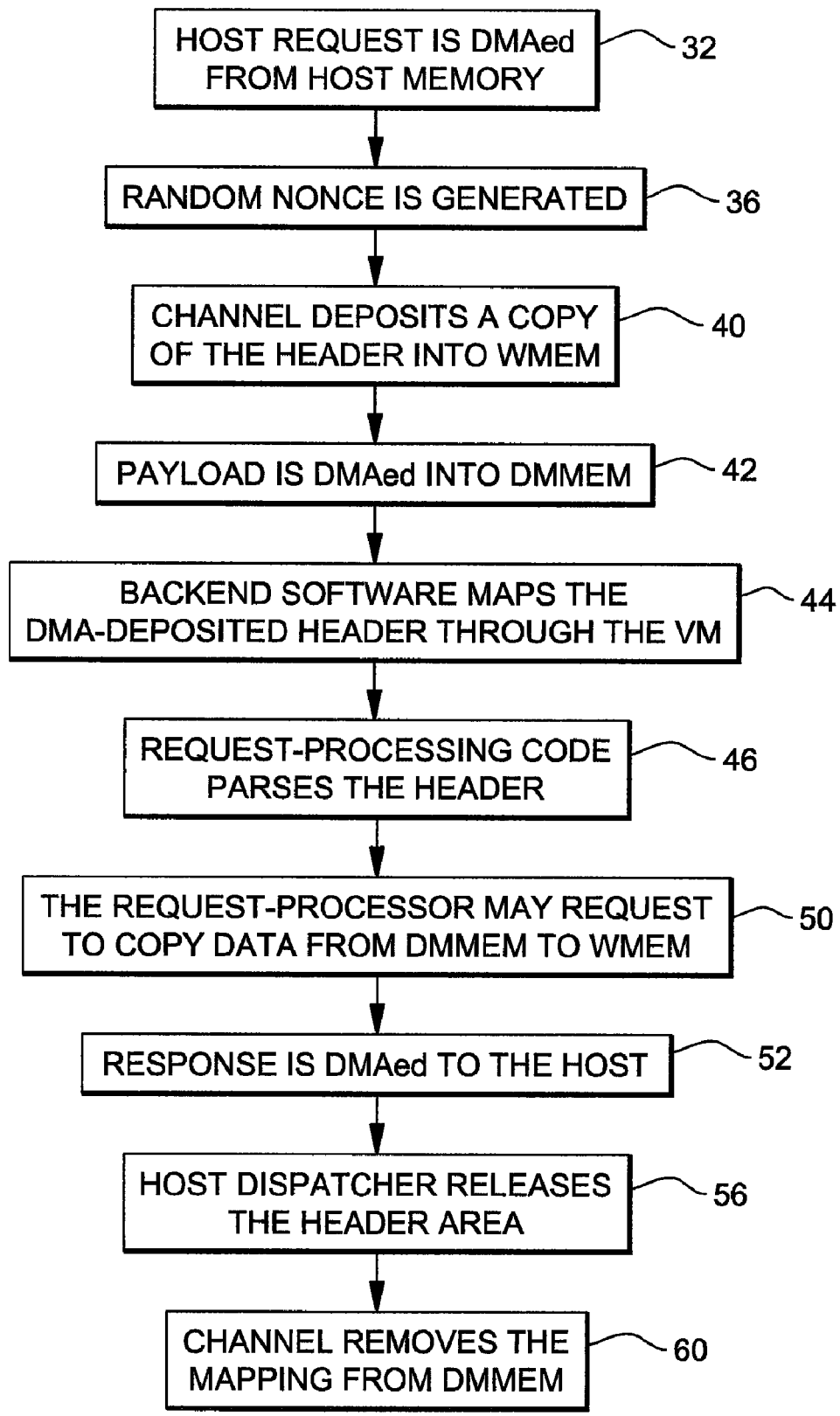
FIG. 2 shows a request flow in accordance with an embodiment of the invention.
Figure 3:
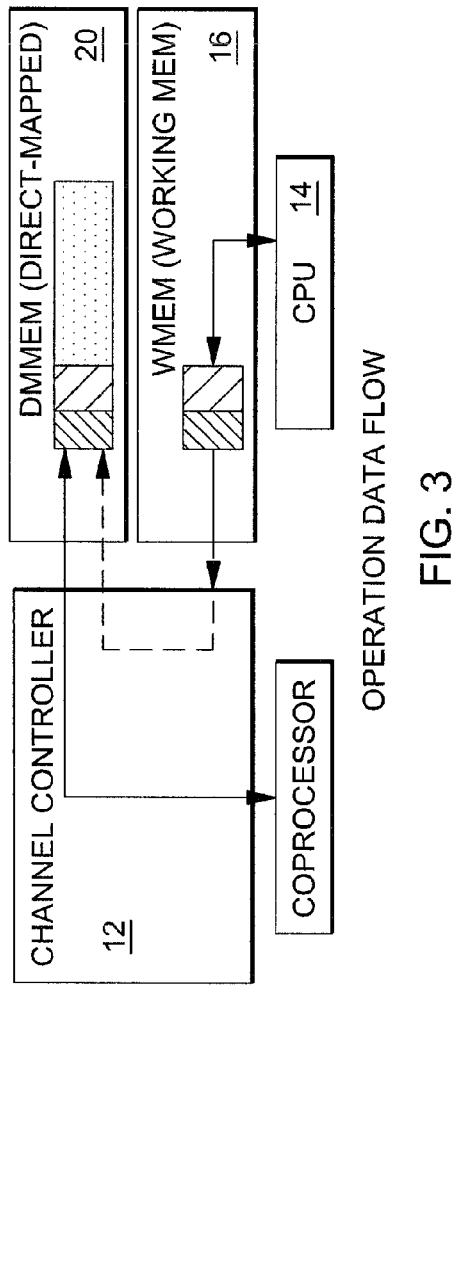
FIG. 3 shows operations data flow in an embodiment of the invention.
Figure 4:
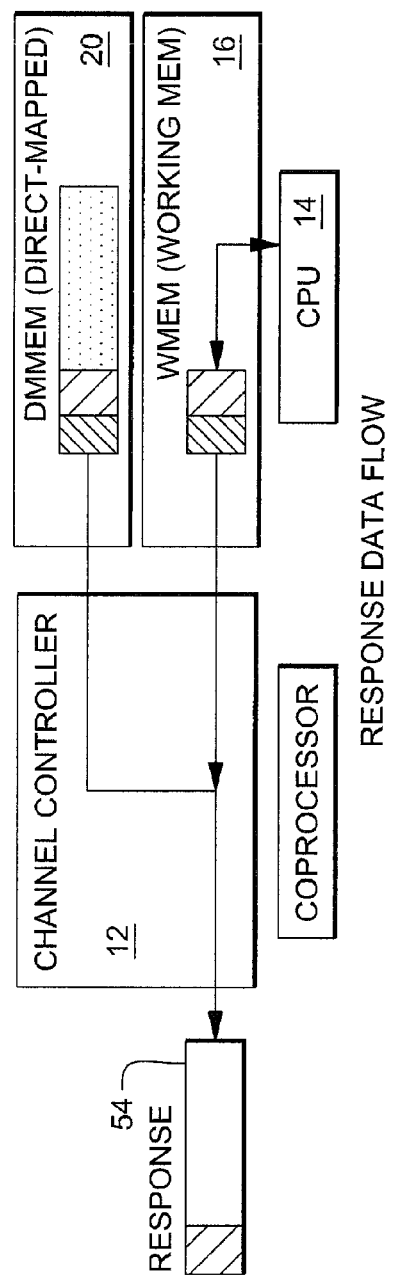
FIG. 4 depicts a response data flow in an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference to FIG. 1, an embodiment of the invention provides a system 10 which features a central communications channel 12, a processor or processors (CPUs), represented at 14, accessing a Working Memory (WMEM) 16, and auxiliary memory 20 reserved for channel use. The auxiliary memory 20 is directly accessible by the channel 12, and specifically, this auxiliary memory is directly mapped memory (DMMEM), entirely addressable by DMA hardware. The DMMEM is reserved to be entirely controlled by the channel, and it is not represented in the CPU virtual memory (VM). For example, the DMMEM may reside in a reserved address range of channel-visible memory. The channel 12 control memory allocation for the entire system 10.

As mentioned above, in a VM environment, addresses perceived by software are mapped indirectly to hardware addresses. If software operations are interleaved with hardware-assisted instructions, cached contents must be repeatedly synchronized with SDRAM contents (inhibiting caching), and one must map between hardware and virtual addresses repeatedly. Mapping and synchronization between virtual and hardware addresses stress VM mechanisms, which is a recognized problem. Zero-copy operations, transforming software to facilitate faster migration between virtual and hardware addressing, is one solution, however this may require significant application-visible adjustment.

Since DMMEM is addressable through hardware-level ("bus") addresses, DMMEM operations do not introduce additional latency. The present invention uses indirect addressing through the channel, where the request owner may access DMMEM-resident payload through special descriptors. Since the entire DMMEM is controlled by the channel, access to DMMEM is not subject to concurrency restrictions, and requires only DMMEM operations (through DMA driven by the channel or directly by accelerator hardware).

Before processing requests, the request dispatcher registers the expected (worst-case) header size, derived from the communication protocol. The channel is informed of the expected header size, associating it with the communication path (possibly one for each path, if the environment supports several virtual channels). Once a header size is registered, arriving requests are automatically separated into header and payload by the channel. The header is replicated, depositing it to both WMEM and DMMEM, therefore the entire request will be visible in DMMEM. It is assumed that the header unambiguously describes payload size and structure (this depends on protocol implementations, but it is a reasonable and realistic assumption).

Existing applications, since they do not issue the header-size-registration call, are supported as a special case. For these applications, the channel does not separate the payload, passing all request data to WMEM. As this behavior is not different from traditional DMA/VM-aware environments, legacy applications may continue to run without modification.

With reference to FIGS. 1-4, typical request flow would be the following, if a header size has been registered by the channel.

At step 32, a host request 34, containing header 34a and payload 34b, is DMAed from a host memory. At step 36, a random nonce is generated by the channel for this request. The nonce will be used to demonstrate request ownership, in case the backend is shared between different processes. At step 40, the channel deposits a copy of the header into WMEM. A copy of the nonce is included with the header. The channel also includes payload length, and a handle that allows software to designate a DMMEM-resident region for a DMA operation. Request handles need not be unpredictable, and in fact they may refer to deterministic properties (such as addresses within DMMEM).

At step 42, the payload is DMAed into DMMEM. Nonce and handle 34c are included with the payload. An embodiment requires non-predictable nonces of sufficient length to make it infeasible for other processes to guess the nonce within the request lifetime. (In a typical environment, requests are short-lived, and unpredictable nonces of a few words' length are assumed to be sufficiently secure.) At step 44, backend software maps the DMA-deposited header through the VM. An interrupt triggers dispatcher code, or an equivalent triggering mechanism (e.g. polling). At this point, the header is addressable through virtual addresses, and software may inspect header contents.

At step 46, request-processing code parses the header. Assuming, for example, cryptographic processing through hardware devices, then, at step 46, the following sub-steps are repeated one or more times:

(a) Software initiates a hardware operation (such as encryption). Input and output length and location are determined by header fields or other software-visible data.

(b) Software specifies a DMMEM-resident region for DMA. A request may include indirect descriptors (which point to within a valid DMMEM region), and needs to include the proper nonce (to show that the requestor is allowed to process this request). A typical request setup would write the DMMEM handle, corresponding nonce, and payload start/length within the request descriptor. These references are sufficient to uniquely identify a payload region, and to authenticate the process which initiated the request.

(c) Request is submitted to a DMA-connected hardware device. During processing, DMMEM-resident regions are directly read or written by hardware devices, without further software involvement.

(d) Response from hardware is DMAed into DMMEM belonging to the same request. Destination may also be located with DMMEM (preferable) or WMEM.

After finishing processing, the request-processor, at step 50, may request to copy data from DMMEM to WMEM. (In most instances, this is assumed to be unnecessary.) The access is only granted with the correct nonce. In such a case, the channel releases part or whole of the reserved DMMEM. It may be noted that while the payload needs to pass through VM, the number of VM interactions may have been reduced even in this case.

At step 52, the response 54 is DMAed to the host. Upon completion of the response DMA, a host dispatcher, at step 56, releases the header area. At step 60, the channel removes the mapping from DMMEM, and releases" the allocated DMMEM region. The nonce is discarded.

If the channel unambiguously differentiates between different memory ranges (such as when handles are DMMEM addresses), system 10 allows mixing of WMEM and DMMEM regions within a sequence ("chain") of descriptors. While WMEM-resident regions still need to be mapped through VM, this capability allows extreme flexibility to accommodate even complex protocol structures. As an example, if a network packet needs to mix decrypted data with software-maintained counters, descriptors could point alternatively to DMMEM (to include parts of decrypted payload) and WMEM (for the counter).

Discarding the nonce immediately after returning a response also allows detection of misbehaving software. DMMEM references which attempt to access memory after the memory has been released will fail, even if their saved nonce was correct. The channel may be extended to provide a specific status to flag misbehaving applications (which attempt to refer to memory after releasing it).

Figure 5:
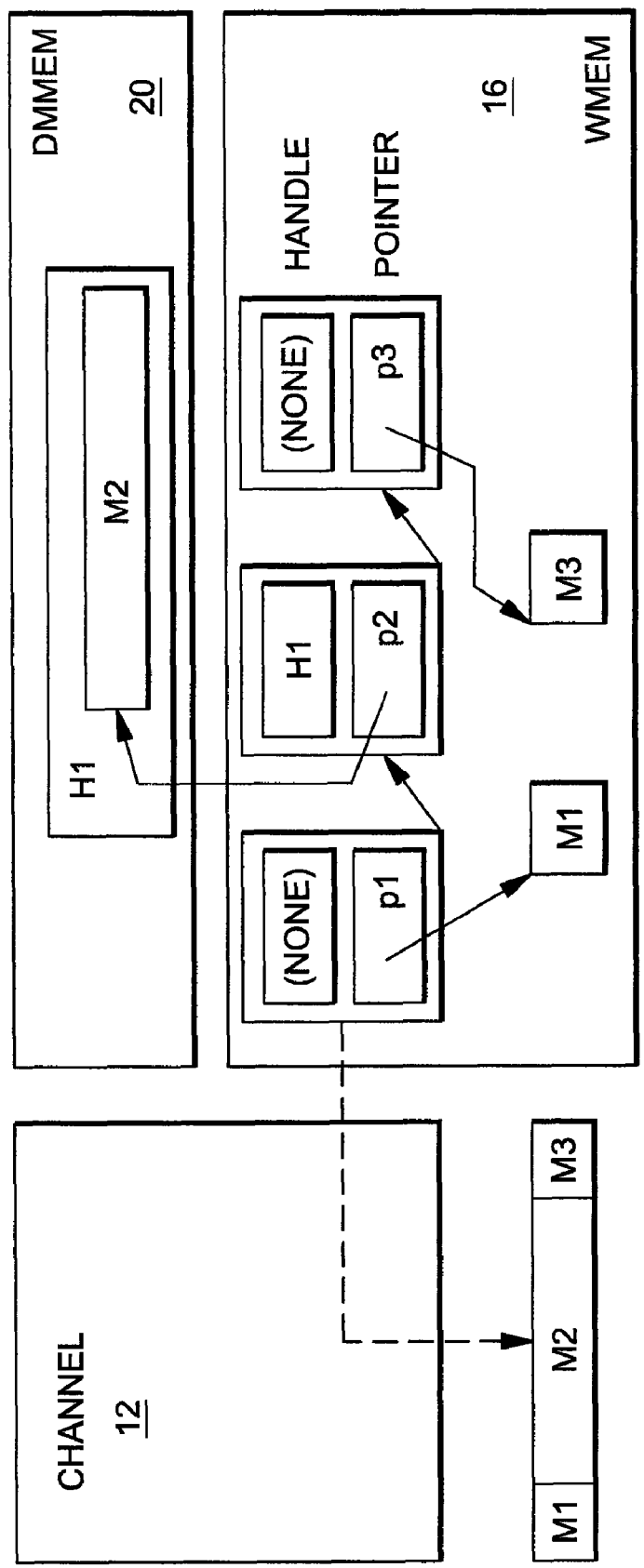
FIG. 5 shows a request description setup in an embodiment of the invention.

An example setup is shown in FIG. 5. This example assumes that the DMMEM-aware application has bulk data in DMMEM, which is augmented by locally constructed, WMEM-resident headers and trailers. The application then constructs a chain of "mixed" descriptor table (DTs), which describe a single request to the channel. In this example, the channel is able to fetch a sequence of DTs in a sequence, therefore a chain of DTs forms a single transfer. Buffers pointed to by the DTs will be concatenated by the channel.

In addition to start/length of buffers, DTs contain a handle, which is associated with each DMMEM-resident buffer. In this example, a special handle (typically, all zeroes) corresponds to WMEM-resident buffers. If the channel encounters a DT with this special handle, it does not consult DMMEM, and instead retrieves the entire buffer from WMEM. (If this special handle is all-zeroes in an otherwise reserved DT field, legacy applications can continue running without updates, since they will not use regions from DMMEM, as they are unaware of DMMEM.)

In this example, DMMEM-resident memory includes a region "M2", which is part of an area with handle "H1". The second DT includes H1, and references M2. A request-specific prefix has been formed in memory region "M1", and trailer/padding has been constructed in "M3". The first and third DTs contain the special handle, indicating WMEM-resident buffers.

When fetching the DT chain, the channel first retrieves M1 from WMEM. The next DT, referencing M2 through its pointer "p2", is authenticated: handle H1 matches that in the DT, therefore the DT is allowed to retrieve M2 and append it to M1. The last, third DT points to M3, without a handle, and is therefore transferred out of WMEM.

As visible in FIG. 5, the reassembled stream (M1 to M3) is passed on to hardware without indicating origins. A similar operation is possible in reverse, transferring responses to a mixture of DMMEM and WMEM-resident buffers, depending on DT setup.

In specific cases, where indirect manipulation of the payload is not sufficient, the channel provides a service to copy the entire payload into working memory. This operation, initiated by the CPU, is not reversible. Once the payload is released from DMMEM, it may no longer be used in direct-access operations, and must be managed by the CPU.

Software is allowed to retrieve specific payload sections, typically starting from the beginning of the payload. In many cases, a limited amount of memory at the beginning (such as lengths, retrieved from encrypted structures) may be useful. Such short regions may be moved to WMEM without significant costs. Allowing software to replicate the beginning of payload to WMEM allows the system 10 to optimize protocols where the payload contains parts of the header (possibly encrypted).

In many or most applications, software may retrieve the entire payload only infrequently, and the system 10 is not optimized for such cases. It is required for unusual situations where further cryptographic operations are driven by data embedded deeply within an encrypted payload, for example. (Such an operation is unusual and would be inefficient in practical communication protocols.)

Assuming sufficient DMMEM is available, payload regions may be allocated with a fixed, predefined amount of trailing memory directly following the payload. The amount of overallocation may be published through a public channel interface, as applications need to be aware of it to exploit it properly. The trailing region belongs to the same request, and the request owner is allowed to access the trailing region as the rest of the payload. (The trailing region may remain unused if the response is not longer than the payload.)

Overallocation allows the system 10 to accommodate, for example, specific cryptographic primitives which can lead to small (fixed) amounts of message expansion, which would otherwise need to separately allocate response buffers. With overallocation, these frequently occurring primitives may be supported in-place, overwriting input data without allocating a new (slightly larger), DMA-accessible, temporary output buffer, which could be costly especially for larger requests.

Two specific cryptographic primitives become easier to implement: Padding of block-oriented symmetric encryption, and public or secret-key signature schemes, most padding schemes add up to one block's worth of padding (typically, up to 16 bytes), regardless of input size. In public or secret-key signature schemes, digital signature or Message Authentication Codes (MACs) typically map messages of arbitrary input sizes into fixed-size signatures (typically up to a few hundred bytes). If overallocation is sufficiently large to accommodate reasonable signatures, many signature-generating operations may be implemented without any temporary memory allocation.

If overallocated DMMEM bytes are cleared when payload is written to DMMEM, the channel may allow read access to them, as they may not reveal any previous DMMEM state to software. Without needing access restrictions, overallocation does not need any additional channel activity (aside from the channel augmenting DMMEM regions/handles to include overallocation).

A flexible implementation of the system 10 may allow, for example, software to dynamically change overallocation through a public channel interface. An actual instance may provide a range of allowed overallocation amounts, and allow software to request a specific value within that range.

System 10 requires a sufficiently large, immediately bus-addressable memory region as DMMEM. Since this region is invisible to software, it is an additional requirement over the memory needs of backend software. Also, the system 10 replicates request headers, keeping a copy within DMMEM as well as WMEM. As protocols are expected to have fixed-size headers, and practically are restricted by a bounded number of outstanding requests, this replication is not significant. If overallocation is supported, it incurs additional per-request costs. In practical protocols, the amount of overallocation could be negligible compared to headers and other overhead.

Figure 6:
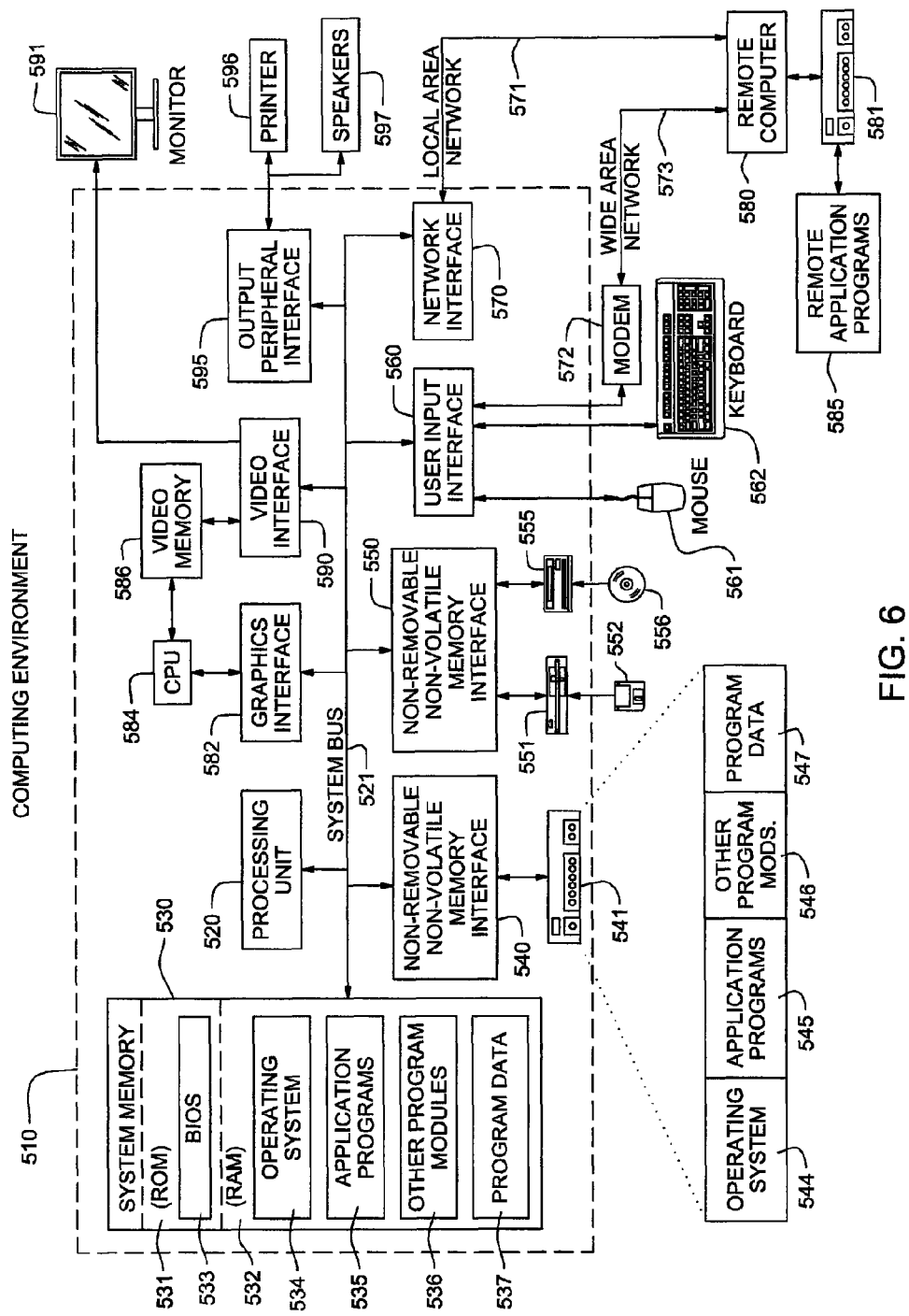
FIG. 6 illustrates a computing environment in which the present invention may be implemented.

With reference to FIG. 6, an exemplary system for implementing the invention includes a general purpose-computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable, volatile/nonvolatile computer storage media. By way of example only, FIG. 6 illustrate a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6 provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host-processing unit 120, and assumes responsibility for accelerated graphics port (AGP) communications. One or more graphics processing units (GPUs) 684 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 691, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of managing a computer memory system including a channel controller and a memory area, the method comprising:
   the channel controller receiving a request including a header and a payload;
   separating the memory area into a working memory area and an auxiliary memory area;
   depositing a copy of the header in the working memory area;
   depositing a full copy of the request, including a copy of the header and a copy of the payload, in the auxiliary memory area;
   using the copy of the request in the auxiliary memory area to perform hardware operations, driven indirectly by software; and
   using the copy of the header in the working memory area to perform software operations;
   wherein the hardware operations are associated with at least one cryptographic operation.

2. The method according to claim 1, wherein the working memory area is directly accessible by a central processor unit associated with a software application to perform said software operations.

3. The method according to claim 1, wherein the working memory area is in virtual memory.

4. The method according to claim 3, wherein the auxiliary memory area is not represented in the virtual memory.

5. The method according to claim 1, wherein the auxiliary memory area is addressable through hardware level addresses.

6. The method according to claim 1, wherein:
   the request is received from a request dispatcher; and
   the channel receiving the request includes the request dispatcher registering an expected maximum header size with the channel.

7. The method according to claim 6, wherein the request dispatcher registering the expected maximum header size includes the request dispatcher registering the expected maximum header size before sending the request to the channel.

8. The method according to claim 1, wherein the depositing a copy of the header in the working memory area comprises including a nonce with the copy of the header.

9. The method according to claim 8, wherein the depositing a copy of the header in the working memory area further comprises including a handle with the copy of the header to allow software to designate an auxiliary memory area-resident region for a direct memory access (DMA) operation.

10. The method according to claim 9, wherein the depositing a full copy of the request in the auxiliary memory area comprises including the nonce and the handle with the copy of the payload.

11. A computer memory system, comprising:
a channel controller; and
a memory area separated into a working memory area and an auxiliary memory area;
wherein:
the channel controller includes an input for receiving a request including a header and a payload;
the channel controller operates to deposit a copy of the header in the working memory area, to deposit a full copy of the request, including a copy of the header and a copy of the payload, in the auxiliary memory area, to use the copy of the request in the auxiliary memory area for hardware operations, and to use the copy of the header in the working memory area for software operations; and
the hardware operations are associated with at least one cryptographic operation.

12. The computer memory system according to claim 11, wherein the working memory area is directly accessible by a central processor unit associated with a software application to perform said software operations.

13. The computer memory system according to claim 11, wherein the working memory area is a virtual memory, and the auxiliary memory area is not represented in the virtual memory.

14. The computer memory system according to claim 11, wherein the auxiliary memory area is addressable through hardware level addresses.

15. The computer memory system according to claim 11, wherein:
the channel controller deposits a nonce and a handle with the copy of the header in the working memory area, said handle being used to allow software to designate an auxiliary memory area-resident region for a direct memory access (DMA) operation; and
the channel controller deposits the nonce and the handle with the full copy of the request in the auxiliary memory area.

16. An article of manufacture, comprising:
at least one computer usable medium having computer readable program code logic to execute a machine instruction in a processing unit for managing a computer memory system including a channel controller and a memory area, wherein the channel controller receives a request including a header and a payload, and said computer readable program code logic, when executing, performing the following:
separating the memory area into a working memory area and an auxiliary memory area;
depositing a copy of the header in the working memory area;
depositing a full copy of the request, including a copy of the header and a copy of the payload, in the auxiliary memory area;
using the copy of the request in the auxiliary memory area to perform hardware operations; and
using the copy of the header in the working memory area to perform software operations;
wherein the hardware operations are associated with at least one cryptographic operation.

17. The article of manufacture according to claim 16, wherein the working memory area is directly accessible by a central processor unit associated with a software application to perform said software operations.

18. The article of manufacture according to claim 16, wherein the working memory area is a virtual memory, and the auxiliary memory area is not represented in the virtual memory.

19. The article of manufacture according to claim 16, wherein the auxiliary memory area is addressable through hardware level addresses.

20. The article of manufacture according to claim 16, wherein:
the request is received from a request dispatcher; and
the request dispatcher registers an expected maximum header size with the channel controller before the request is received from the request dispatcher.

* * * * *